(12) United States Patent
Kang et al.

(10) Patent No.: US 7,411,366 B2
(45) Date of Patent: Aug. 12, 2008

(54) ELECTRIC POWER-ASSIST SYSTEM FOR MANUALLY-OPERATED VEHICLE

(75) Inventors: Tien Yew Kang, Singapore (SG); Kian Teck Teo, Singapore (SG); Yubin Liu, Singapore (SG)

(73) Assignees: Matsushita Electric Industrial Co., Ltd., Osaka (JP); Panasonic Semiconductor Asia Pte. Ltd., Singapore (SG)

(*) Notice: Subject to any disclaimer, the term of this patent is extended or adjusted under 35 U.S.C. 154(b) by 122 days.

(21) Appl. No.: 11/559,132

(22) Filed: Nov. 13, 2006

(65) Prior Publication Data
US 2008/0111511 A1 May 15, 2008

(51) Int. Cl.
*H02P 7/00* (2006.01)
(52) U.S. Cl. .......... 318/432; 318/430; 318/434; 318/466; 180/446
(58) Field of Classification Search ......... 318/430–434, 318/460–466; 180/446
See application file for complete search history.

(56) References Cited

U.S. PATENT DOCUMENTS

| | | | | |
|---|---|---|---|---|
| 4,794,536 A | * | 12/1988 | Eto et al. | 701/41 |
| 4,884,227 A | * | 11/1989 | Watanabe | 702/141 |
| 6,089,344 A | * | 7/2000 | Baughn et al. | 180/446 |
| 6,807,471 B2 | * | 10/2004 | Fujimori | 701/41 |
| 6,992,449 B2 | * | 1/2006 | Iwami et al. | 318/432 |
| 7,163,080 B2 | * | 1/2007 | Fardoun et al. | 180/446 |
| 7,336,047 B2 | * | 2/2008 | Ueda et al. | 318/432 |
| 2004/0206563 A1 | | 10/2004 | Murata | |

OTHER PUBLICATIONS

U.S. Appl. No. 11/559,139 to Kang et al., filed Nov. 13, 2006.

* cited by examiner

*Primary Examiner*—Paul Ip
(74) *Attorney, Agent, or Firm*—Greenblum & Bernstein, P.L.C.

(57) ABSTRACT

An electric power-assist system for a manually operated vehicle, such as a bicycle, has a pedal with Hall sensors for producing a signal representing a rotational speed of the pedal, and an electric motor for power assisting the driving force of the bicycle. A speed counter, speed decision block, up/down counter, and comparator are provided so that the power assist by the electric motor increases or degreases, as the speed of the manual controlling device increases or decreases, respectively.

8 Claims, 7 Drawing Sheets

ELECTRIC POWER-ASSIST SYSTEM FOR MANUALLY-OPERATED VEHICLE

BACKGROUND OF THE INVENTION

The present invention relates to an electric power-assist system for a manually-operated vehicles, and more particularly, to an electric bicycle having a motor used for assisting the pedaling force.

An electric power-assist system for manually-operated vehicle is able to deliver power according to current efforts devoted by the vehicle operator. With this electric power-assist system, vehicle operator is able to achieve the same speed with less effort, as compared to the situation when the vehicle is purely human power driven. Thus the operator is able to operate the vehicle in a more efficient way.

Figure 1:
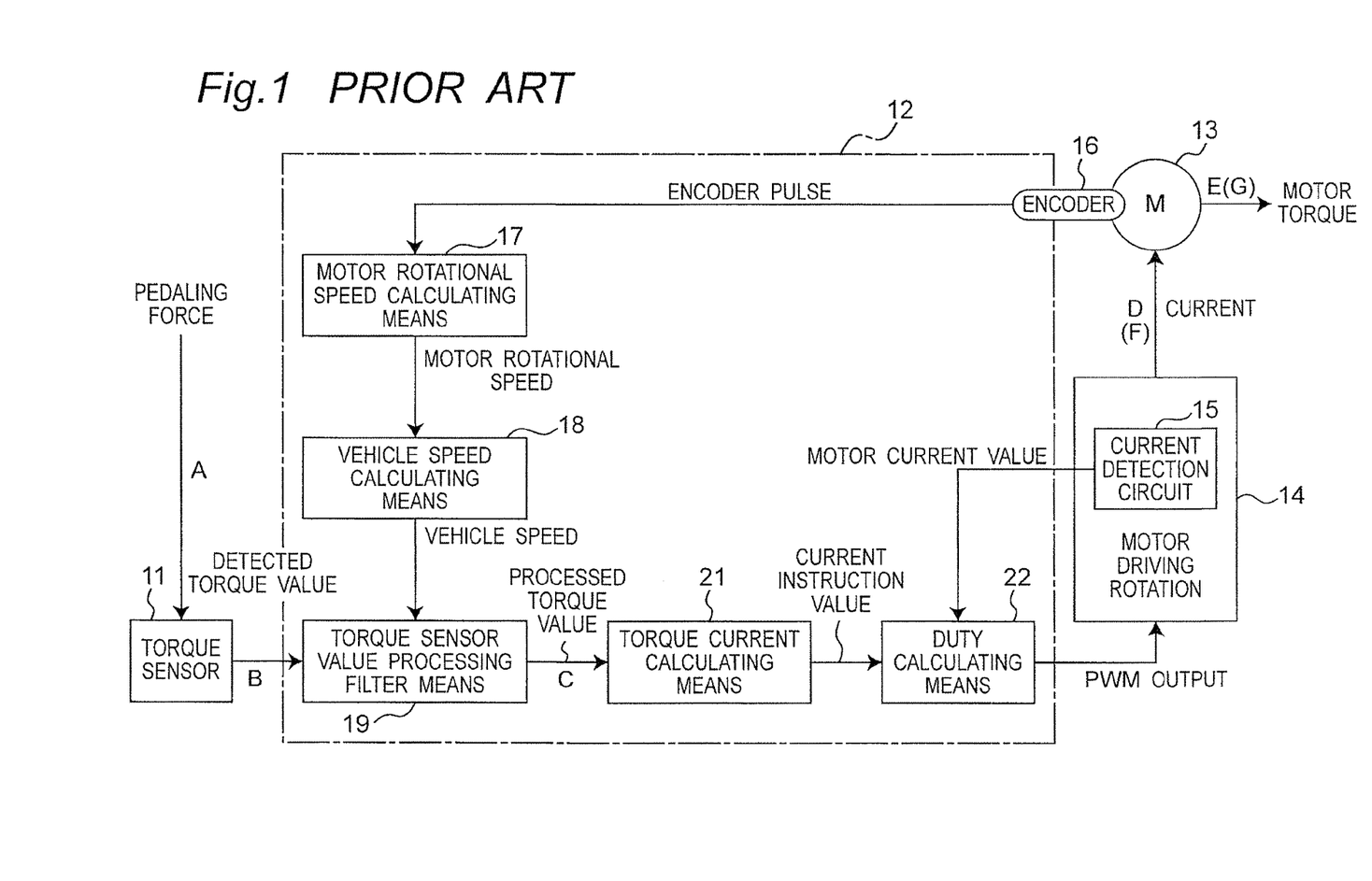
FIG. 1 is a block diagram showing the conventional architecture for electric power-assist system.

Currently, the electric power-assist system is implemented on a vehicle, such as shown in FIG. 1 of US2004/0206563A1, which takes an electric bicycle as an example. Pedaling force is sensed by torque sensor 11, which converts this force information to a signal. This signal is processed by units 19, 21 and 22, which decide how much PWM to output to motor driving block 14. Block 14 then controls the motor 13, which contains an encoder 16 that senses the rotation speed of the motor. Information from 16 is feedback to unit 19 via speed calculating blocks 17 and 18. Therefore the speed is regulated.

However, use of torque sensor bears a high cost, and leads a higher price of vehicles. Another existing method of implementing the electric power-assist system employs the "Hall sensor"—where the Hall sensor is used to sense the vehicle speed to be more than a certain threshold and then a fixed current is commanded in the motor. This method does not have advance feature of controlling the motor power output proportional to the human power input. Hence there will be a problem of unequal power output from the motor, resulting in insufficient assisting power from the motor during high speed or too much assisting power from the motor during low speed.

Therefore, a need arises such that the cost is brought down while advance feature of adapting assist power to human power effort is implemented.

SUMMARY OF THE INVENTION

An object of this present invention is to reduce the system cost by using Hall sensors, as well as to realize advance feature of controlling the motor power output proportional to human power input.

According to the present invention, an electric power-assist system for a manually operated vehicle having a rotatable manual controlling device, said electric power-assist system comprises: a speed sensor for detecting the rotational speed of the manual controlling device; a speed decision block for comparing the rotational speed of the manual controlling device with a reference speed to detect whether the rotational speed of the manual controlling device is accelerating or decelerating; an up/down counter for increasing a count when the rotational speed of the manual controlling device is accelerating and decreasing a count when the rotational speed of the manual controlling device is decelerating; an electric motor for power assisting the driving force of a wheel of the vehicle; a power driver for supplying power to the electric motor and for producing a current power level signal representing the current power level supplied to the electric motor; and a comparator for comparing the counted result of the up/down counter converted into analog form with the current power level signal.

By the present invention, the amount of assisting power delivered by the electric motor increases or decreases, as the speed of the manual controlling device increases or decreases, respectively. It is therefore possible to control the power level of the electric motor relatively to the speed of the pedal, i.e., the manual controlling device, with a simple structure.

DETAILED DESCRIPTION OF THE PREFERRED EMBODIMENT

The electric power-assist system of the present invention can be applied to a manually-operated vehicle of various kinds, such as a bicycle, a tricycle, a wheelchair, a shopping cart or any other vehicle with wheels. Here, an electric bicycle is taken as an example for illustration. It should be noted that an electric bicycle is only one example of manually-operated vehicles, and it is here only for illustrative purpose.

Before the actual implementation of the present invention is described, the underlying principles pertaining to the invention are first described.

If pi equals to 3.142, spd represents the speed of the bicycle in the unit of meters per second, R the radius of wheel in meters, and Tw the time taken for 1 revolution of the wheel, then the bicycle speed can be calculated as below:

$$spd = (2*pi*R)/Tw \qquad (1).$$

For any manually-operated vehicle, human operator needs a certain device, through which he or she is able to operate the vehicle. In the case of bicycle, this device is in the form of pedals and gears, and, according to the present invention, equipped with Hall sensors. Suppose the pedal is continuously monitored by Hall sensors, it is possible to track the pedal's position information, and hence its speed information. These Hall sensors subsequently output a signal containing the speed information. Because of the rotational nature of pedal, the output signal from Hall sensor is a series of pulses. If one revolution of the pedal generates a number of pulses, such as x pulses, x rising edges in the signal from the pedal Hall sensors can be detected. If Tp is the time between two consecutive Hall sensor signal rising edges, then, $$\text{one pedal revolution time} = x*Tp \qquad (2).$$

If the bicycle wheel makes y revolutions during one revolution of the pedal, then a timing relation can be established:

$$\text{one pedal revolution time} = y*Tw \qquad (3).$$

From equations ②  and ③, $$Tw=(x*Tp)/y \qquad (4)$$

Figure 3:
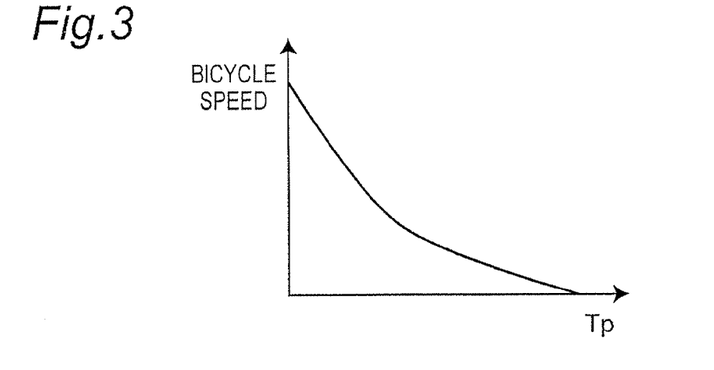
FIG. 3 shows the relationship between vehicle speed and the timing between two consecutive Hall sensor signal rising edges.

Substituting ④ into ①, Tp is found to relate to the speed of the bicycle by equation:

$$spd=y*(2*pi*R)/(x*Tp) \qquad (5),$$

where Tp is inversely proportional to spd. Hence, the faster the pedal is stepped, the smaller the time is between two consecutive Hall sensor signal rising edges, and the higher the bicycle speed is. This relationship is plotted in FIG. 3.

It is assumed that, (1) the bicycle is driven 100% electrically; (2) motor current is proportional to the bicycle speed; (3) motor current is controlled by the output of a DAC (digital analog converter), which is linearly related the DAC input, DAC setting.

Figure 4:
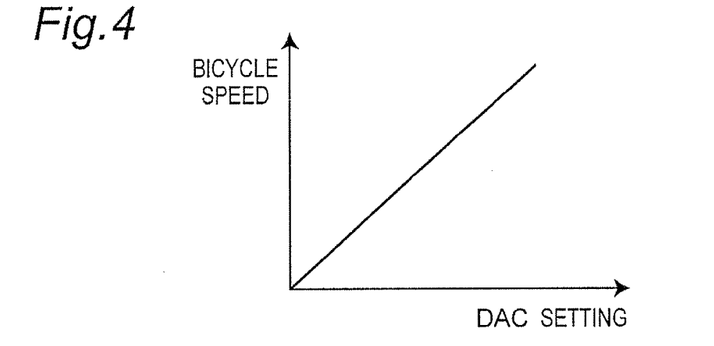
FIG. 4 shows the relationship between DAC setting and corresponding vehicle speed.

Therefore, $$spd=k*DAC \text{ setting} \qquad (6),$$

where k is a proportional coefficient. The above relationship between DAC setting and bicycle speed spd is plotted in FIG. 4. It can be seen that to achieve a higher bicycle speed, a higher DAC setting is needed, resulting in higher motor current and higher motor output thereof.

Substituting ⑥ into ⑤, Tp is found to relate to the DAC input, DAC setting by equation:

$$DAC \text{ setting}=y*(2*pi*R)/(x*k*Tp) \qquad (7),$$

Figure 5:
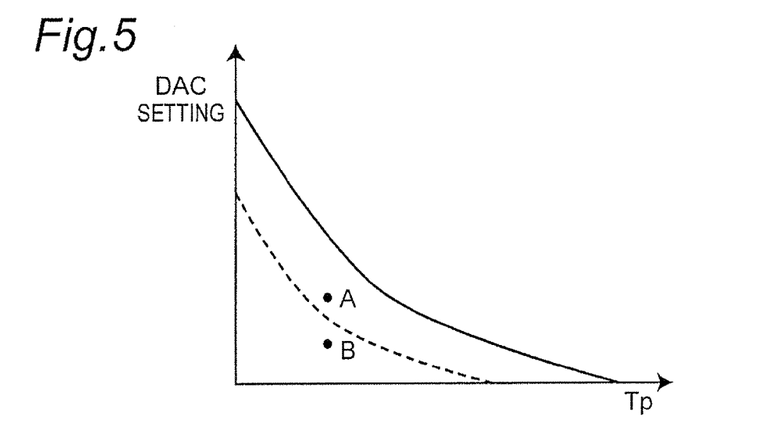
FIG. 5 shows the relationship between the timing between two consecutive Hall sensor signal rising edges and DAC setting.

This relationship governed by ⑦ is plotted in FIG. 5 with a solid line.

The electric power-assist system acts only to assist the human power, but not overtaking it. Therefore, with electric power-assist system, only a fraction of the power required to drive the bicycle 100% electrically is desired. This can be adjusted by the proportional coefficient k. Graphically, this is represented by a dotted line, the downward shifted version of the solid line. This relationship is pre-programmed into the electric power-assist system.

Therefore, with the above relationship, it is obvious that Tp, the time between two consecutive Hall sensor signal rising edges, can be used to determine the DAC setting needed to provide assisting power to the motor for implementing the electric power-assist system, as according to the pre-programmed relationship. Hence, the faster the pedal is stepped, the smaller the Tp, the higher the DAC setting, and the higher the assisting power. Contrast to this, the slower the pedal is stepped, the larger the Tp, the lower the DAC setting and the lower the assisting power.

For a certain Tp, if its corresponding DAC setting is on the right side of the dotted line (point A), it means that the DAC setting is too high for that corresponding pedal speed, and needs to be adjusted down to match the pedal speed. Conversely, if DAC setting falls on the left side of the dotted line (point B), then the DAC setting is too small for that corresponding pedal speed, and needs to be brought higher to match the pedal speed.

The actual implementation of this arrangement is described in detail below.

Figure 2:
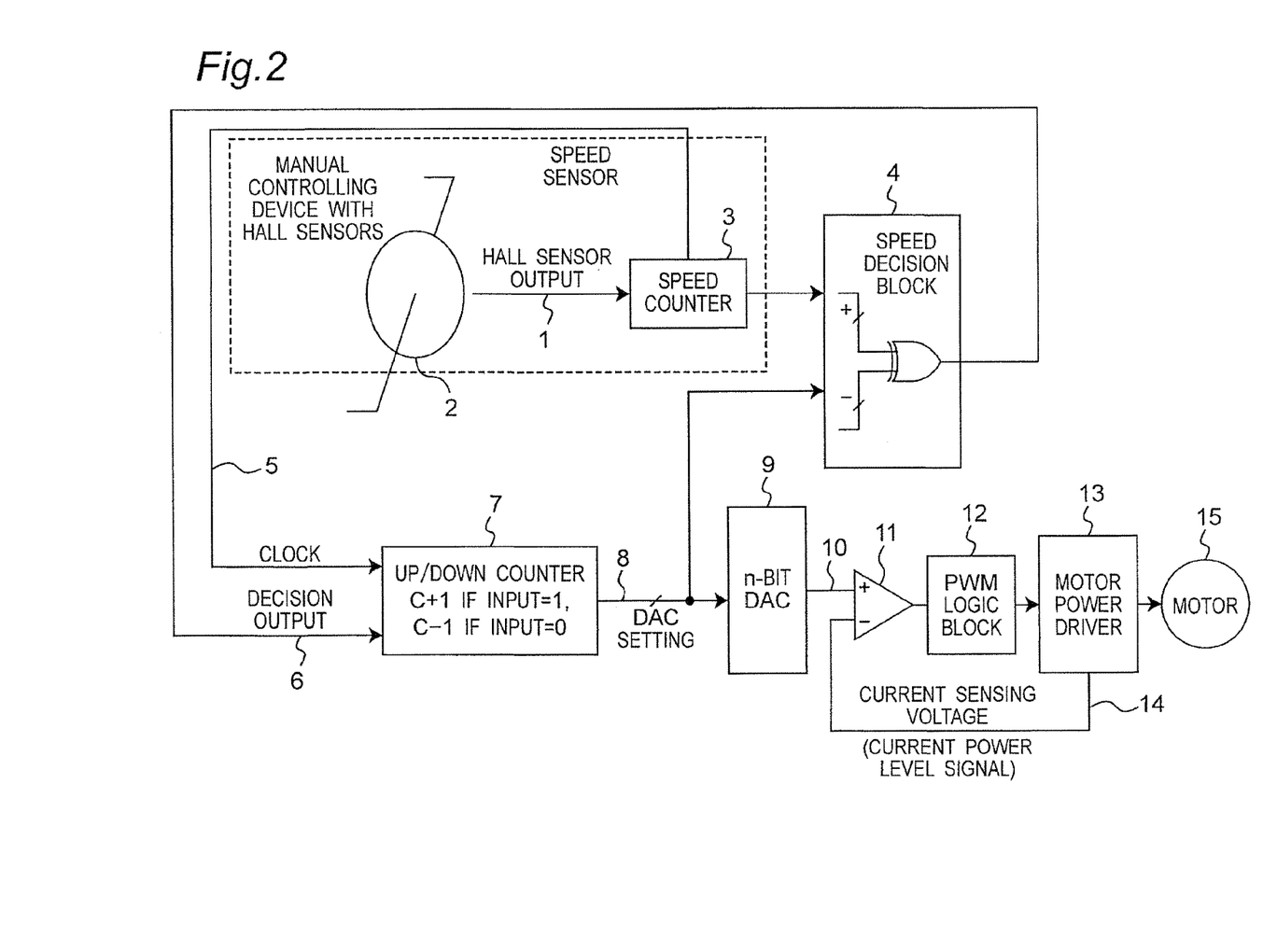
FIG. 2 is a block diagram showing an architecture utilizing Hall sensors as well as counters of Embodiment according to the present invention.

Referring to FIG. 2, the electric power-assist system according to the present invention has a pedal 2, a speed counter 3, a speed decision block 4, an up/down counter 7, an n-but DAC (digital analog converter) 9, a comparator 11, a PWM (pulse width modulation) logic block 12, a motor half bridge power driver 13 and a motor 15. Motor 15 is connected to a wheel (not shown) of the bicycle for power assisting the driving force of the wheel. The pedal 2 is provided in association with Hall sensors. The pedal provided with Hall sensors is generally referred to as a manual controlling device with Hall sensors. Thus the manual controlling device is rotatable. In the case of the tricycle, the manual controlling device is a rotatable pedal, in the cases of the wheelchair and shopping cart, the manual controlling device is a wheel. The Hall sensors and the speed counter 3 define a speed sensor.

Figure 6A:
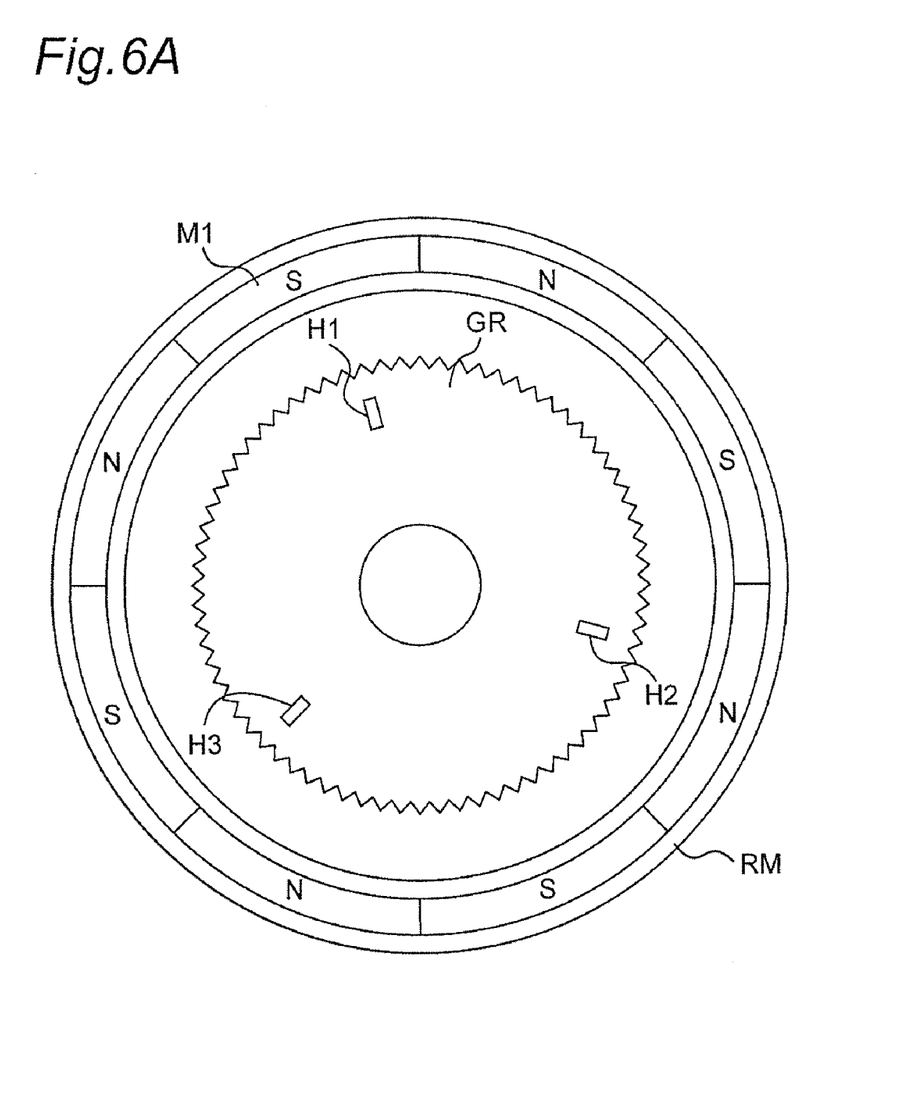
FIGS. 6A, 6B, 6C and 6D are diagrams showing arrangements of the Hall sensors with respect to the pedal.
Figure 6B:
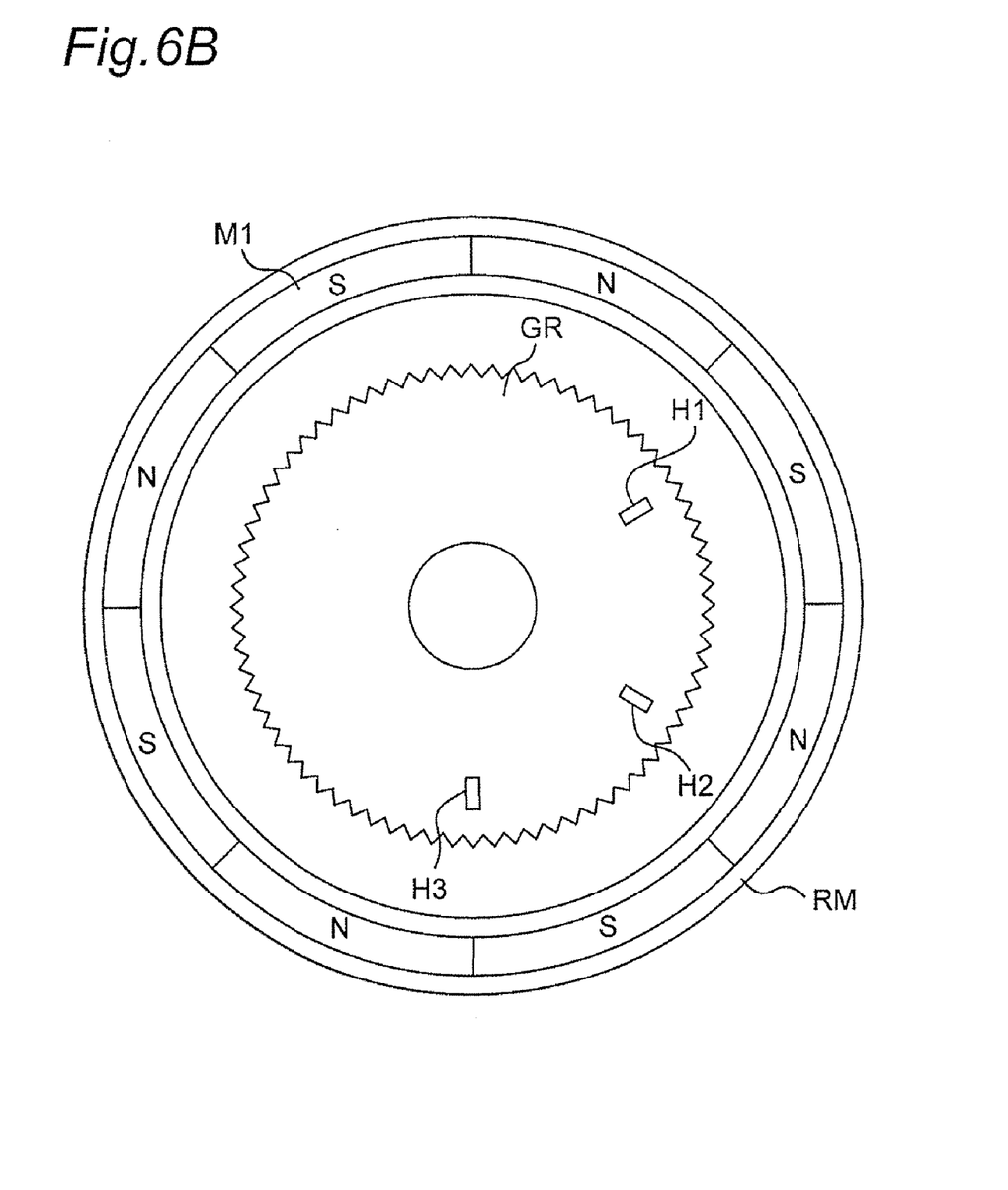
Figure 6C:
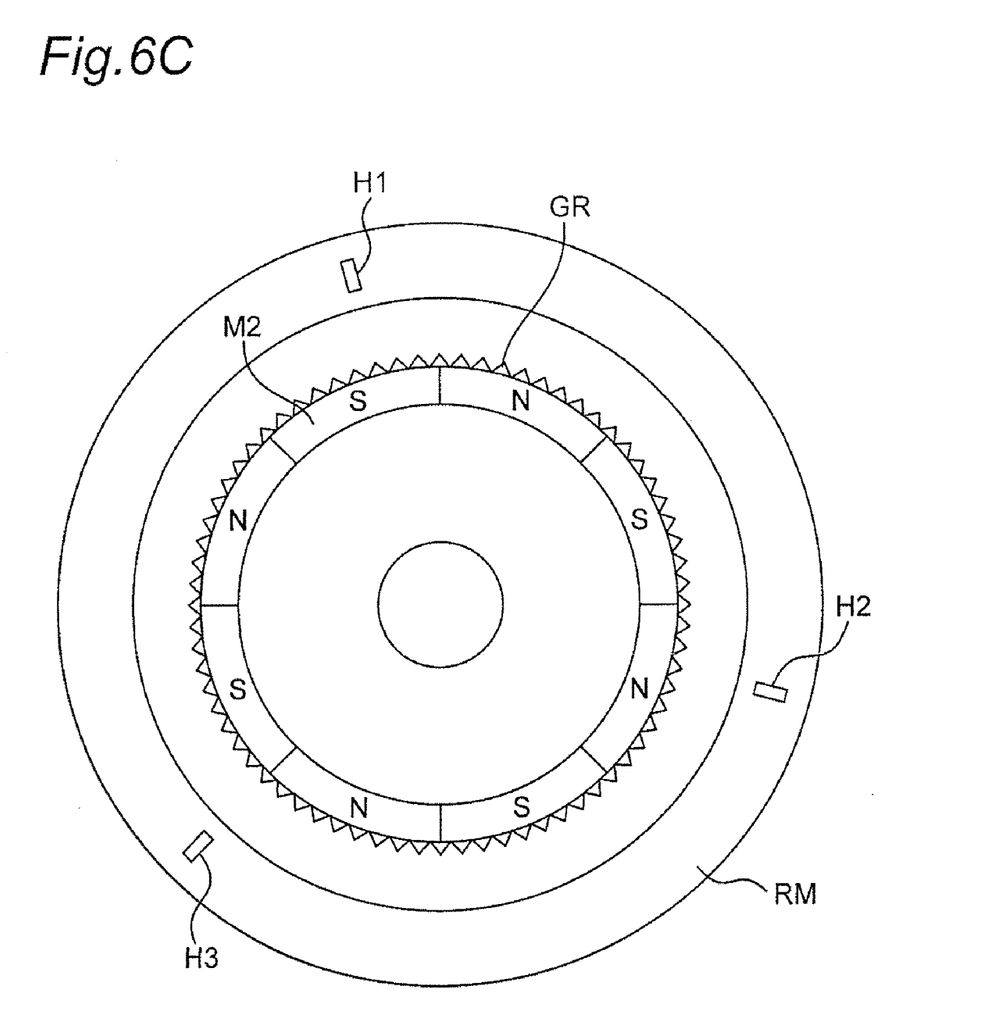
Figure 6D:
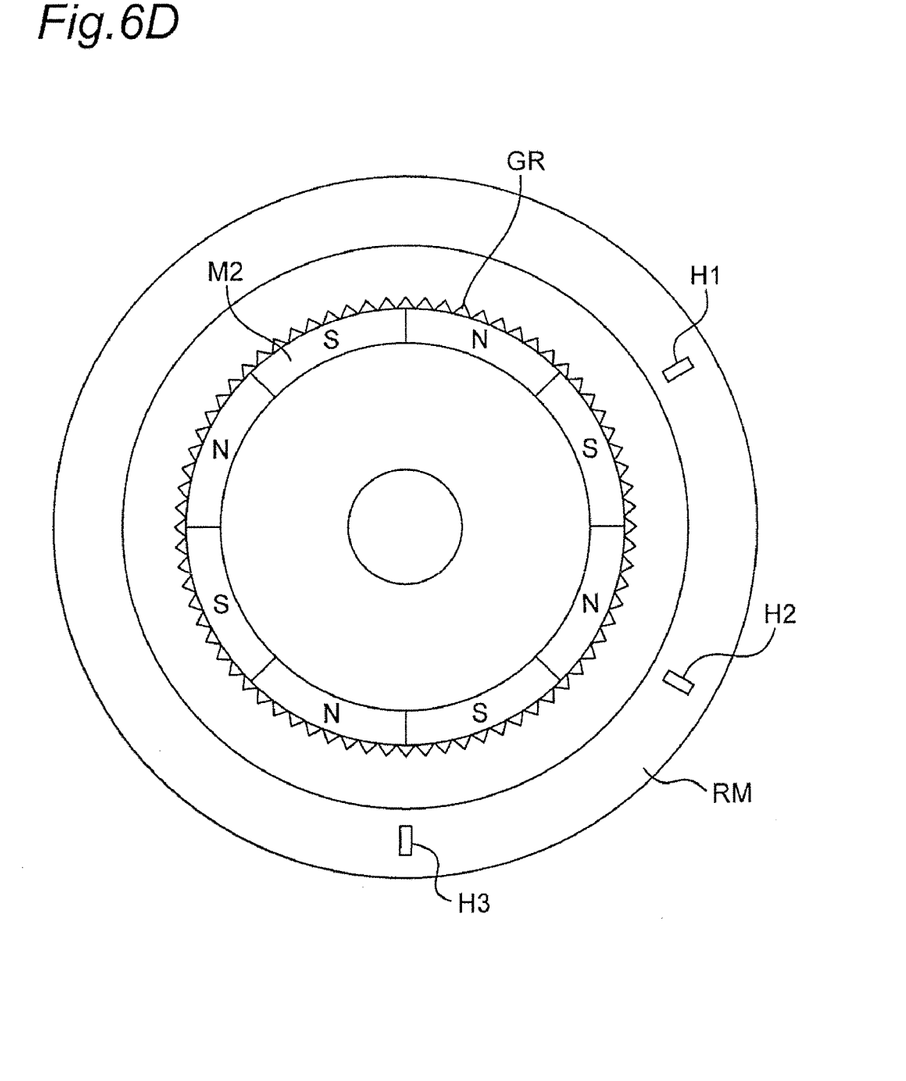

Referring to FIG. 6A, one example of arrangement of the Hall sensors with respect to the pedal is shown. The pedal is firmly connected to a gear or a chain-ring GR. Provided around the gear GR is the frame RM. The gear GR is provided with Hall sensors H1, H2 and H3 which are located equidistant from the center and are spaced at equal angle of 120 degrees. Provided on the frame RM are permanent magnets M1 so that four N poles and four S poles appear alternately at equal spaced angle of 45 degrees. As the gear GR rotates, the Hall sensors H1, H2 and H3 detects the magnetic field change, resulting in producing of pulses, or sinusoidal signal. By one revolution or rotation of the gear GR the Hall sensor H1, produces a signal of four cycles. By combining the signals from Hall sensors H1, H2 and H3, a signal of twelve cycles is produced by one revolution of the gear GR. The number of the Hall sensors can be any other number than three, and can be located at different places. Modifications of arrangement for providing Hall sensors are shown in FIGS. 6B, 6C and 6D. The number of the Hall sensors can be any number from one. Also, the number of pairs of N pole and S pole can be any number from one.

Referring to FIG. 6B, Hall sensors H1, H2 and H3 are provided equidistant from the center, and Hall sensors H1 and H3 are spaced 60 degrees from Hall sensor H2.

Referring to FIG. 6C, Hall sensors H1, H2 and H3 are provided on the frame RM and are spaced at equal angle of 120 degree. Provided on the gear GR are permanent magnets M1 so that four N poles and four S poles appear alternately at equal spaced angle of 45 degrees.

Referring to FIG. 6D, Hall sensors H1, H2 and H3 are provided on the frame RM. Hall sensors H1 and H3 are spaced 60 degrees from Hall sensor H2.

The speed of an electric bicycle's pedal 2 is continuously monitored by Hall sensors. The output signal from the Hall sensors 1 is applied to speed counter 3. Speed counter 3 counts time between two consecutive pulses from the Hall sensor, such as between two consecutive Hall sensor signal rising edges, which is the Tp information. Speed counter 3 may be so arranged to count the number of pulses per a unit time. Thus, the speed counter 3 detects the rotational speed of pedal 2, i.e., the manual controlling device. The counter output is such that, per a unit time, the faster the pedal is stepped, the greater the count is. Thus, per a unit time, the counted result of a high value corresponds to a fast pedal speed, and a low value corresponds to a slow pedal speed.

Speed decision block 4 compares the current pedal speed count and the current DAC setting 8 which serves as a reference speed. When current pedal speed increases, the output of speed counter 3 increases. If current pedal speed count 3 is higher than the current DAC setting 8, the pedal decision block output 6 is HIGH. When pedal speed decreases, the pedal speed count 3 decreases accordingly. If the current pedal speed count 3 is lower than the current DAC setting 8, the pedal decision block output 6 is LOW. Thus, speed decision block 4 detects whether the rotational speed of the manual controlling device is accelerating or decelerating.

The output 6 of speed decision block 4 is then fed to an up/down counter 7. The up/down counter 7 has two inputs and one output. The two inputs are applied with the output signal 6 of pedal speed decision block 4, and a clock signal 5, which is generated at every rising edge of the pedal Hall sensors 1. The output is the count of the up/down counter 7, and used as the DAC setting 8. At the rising edge of clock input 5, the output 8 of this up/down counter 7 increments the count 8 when pedal decision block output 6 is HIGH, and decrements the count 8 when pedal decision block output 6 is LOW.

The DAC setting 8 then goes to an n-bit DAC 9. The input-output characteristic of DAC 9 is as below: the higher the count of DAC setting 8, the higher the DAC output voltage; the lower the count, the lower the DAC output voltage.

The DAC 9 produces a voltage 10 which is subsequently compared with current sensing voltage 14 by a comparator 11. The current sensing voltage 14 is a voltage directly proportional to the actual motor current. Thus, the current sensing voltage 14 is a current power level signal representing the current power level supplied to the electric motor 15. The output of comparator 11 goes high if n-bit DAC output 10 is higher than current sensing voltage 14. And comparator 11 output voltage goes low when n-bit DAC output 10 is lower than current sensing voltage 14. Thus, the comparator 11 compares the counted result of the up/down counter 7 with the current power level signal 14.

The output of comparator 11 is applied to a PWM logic block 12 which controls the turning on or off of the motor half bridge power driver 13. When comparator 11 output is low, it means that the motor current is higher than what the n-bit DAC output 10 is commanding. Thus, PWM logic block 12 will drive the motor power driver at a lower duty cycle. Consequently, the motor coil current decreases. When comparator 11 output is high, it means that the motor current is lower than what the n-bit DAC output 10 is commanding. Hence the PWM logic block 12 will drive the motor power driver 13 at a higher duty cycle for a higher motor current. When the motor is running at regulated speed, the current sensing voltage 14 will be close to the n-bit DAC output voltage 10.

Thus, the amount of assisting power delivered by the electric motor increases or decreases, as the speed of the manual controlling device increases or decreases, respectively.

The control mechanism of this loop is illustrated below. Speed counter 3 will be detecting and counting the time between two consecutive rising edges of the pedal Hall sensors signal 1. This will be the Tp information, and compared with the present DAC setting 8 via a speed decision block 4. The comparison criteria will be as the dotted line shown in FIG. 5. If the pedal 2 speed slows down, the speed decision block 4 output 6 will be LOW. At every rising edge of the pedal Hall sensor signal 1, a clock pulse 5 will be generated to trigger the up/down counter 7. If the speed decision block 4 output 6 is a LOW at the clock edge, then the counter 7 will count down. The output of the up/down counter, or DAC setting 8 will directly control DAC 9. The lower the output count of the up/down counter 7, the lower the DAC output 10. In this way, the DAC 9 can always be regulated within one count of the reference dotted line in FIG. 5. Conversely, if the pedal 2 speeds up, the output of DAC 9 increases and sets the motor to a higher speed. Hence the motor 12 is able to output assisting power proportional to the pedal speed.

In the above example, the rising edge of the pedal Hall sensor signal 1 is used, but any other part, such as the falling edge or a peak point can be used.

In the above example, the control can be carried out with analog signal only, or digital signal only. In such a case, the DAC is not necessary. Also, the motor half bridge power driver 13, which uses the PWM logic block, can be any other type of power driver.

The above-described disclosure of the invention in terms of the presently preferred embodiments is not to be interpreted as intended for limiting. Various alterations and modifications will no doubt become apparent to those skilled in the art to which the invention pertains, after having read the disclosure. As a corollary to that, such alterations and modifications apparently fall within the true spirit and scope of the invention. Furthermore, it is to be understood that the appended claims be intended as covering the alterations and modifications.

What is claimed is:

1. An electric power-assist system for a manually operated vehicle having a rotatable manual controlling device, said electric power-assist system comprising:
   a speed sensor for detecting the rotational speed of the manual controlling device;
   a speed decision block for comparing the rotational speed of the manual controlling device with a reference speed to detect whether the rotational speed of the manual controlling device is accelerating or decelerating;
   an up/down counter for increasing a count when the rotational speed of the manual controlling device is accelerating and decreasing a count when the rotational speed of the manual controlling device is decelerating;
   an electric motor for power assisting the driving force of a wheel of the vehicle;
   a power driver for supplying power to the electric motor and for producing a current power level signal representing the current power level supplied to the electric motor; and
   a comparator for comparing the counted result of the up/down counter with the current power level signal,
   whereby the amount of assisting power delivered by the electric motor increases or decreases, as the speed of the manual controlling device increases or decreases, respectively.

2. The electric power-assist system according to claim 1, wherein said speed sensor comprises Hall sensors provided in association with the manual controlling device for producing pulses relatively to the rotational speed of the manual controlling device, and a speed counter for counting a time between two consecutive pulses.

3. The electric power-assist system according to claim 1, further comprising a digital analog converter for converting the count of the up/down counter, which is in the digital format, to an analog format.

4. The electric power-assist system according to claim 1, wherein said power driver comprises a motor power driver and a pulse width modulation logic block.

5. The electric power-assist system according to claim 1, wherein the manual controlling device is a pedal with a gear.

6. The electric power-assist system according to claim 5, wherein the Hall sensors are provided on the gear, and permanent magnets are provided on a frame provided around the gear.

7. The electric power-assist system according to claim 5, wherein the Hall sensors are provided on a frame provided around the gear, and permanent magnets are provided on the gear.

8. A method for the electric power-assist system for a manually operated vehicle having a rotatable manual controlling device according to claim 1 to assist the vehicle, the method comprising the steps of:
   Sensing the rotational speed of the manual controlling device, and extracting this speed information with the speed sensor;

Comparing this information with a prescribed relation to check if the manual controlling device is accelerating or decelerating, by the speed decision block;

Updating the up/down counter output count as according to the comparison result, and therefore producing a counted result proportional to the counter output, which is to control driving current through the electric motor;

Comparing the counted result with the current power level signal generated by the motor power drive by the analog comparator, and thereof producing a comparison result as a PWM command signal;

Driving the motor by motor power driver, directed by the PWM signal from the PWM logic block, wherein the PWM logic block produces PWM signal based on the PWM command signal.

* * * * *